June 23, 1936.   H. E. WANER   2,044,961
METHOD AND APPARATUS FOR MAKING INNER TUBES FOR TIRES
Filed July 25, 1935   2 Sheets-Sheet 2
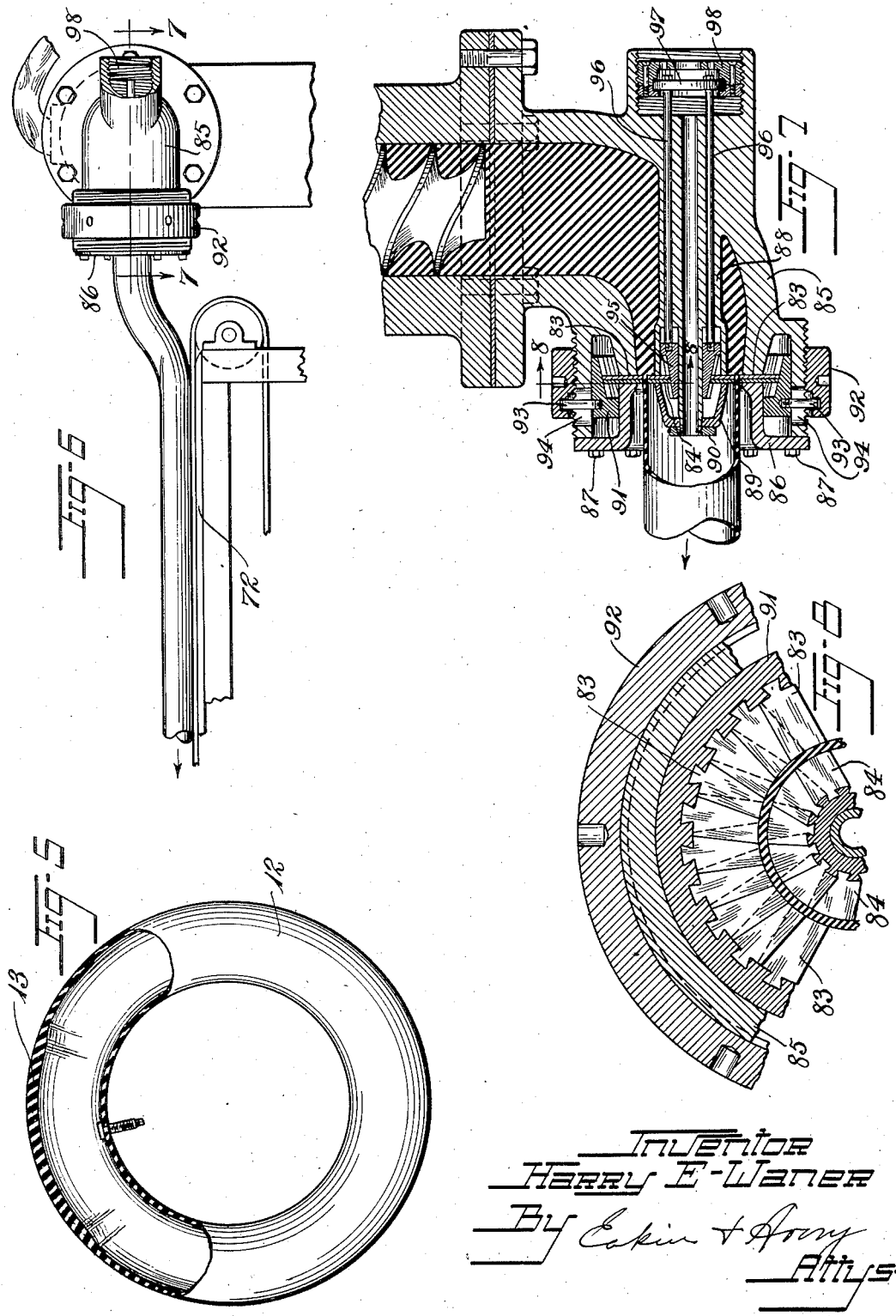

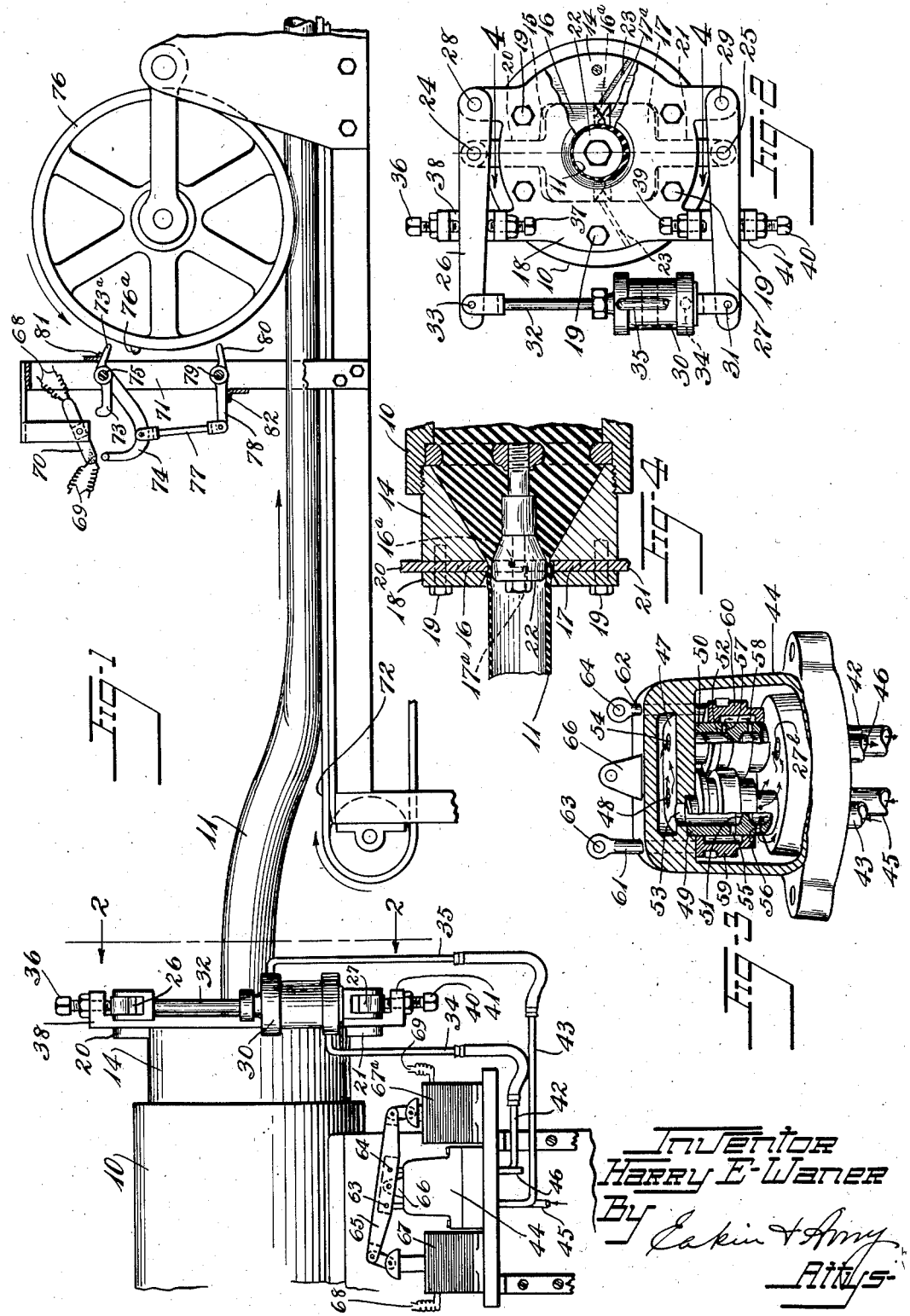

Patented June 23, 1936

2,044,961

UNITED STATES PATENT OFFICE 2,044,961

METHOD AND APPARATUS FOR MAKING INNER TUBES FOR TIRES

Harry E. Waner, Akron, Ohio, assignor to The B. F. Goodrich Company, New York, N. Y., a corporation of New York Application July 25, 1935, Serial No. 33,003

8 Claims. (Cl. 18—14)

This invention relates to procedure and apparatus for making inner tubes for tires and its chief object is to provide conveniently and economically for producing an inner tube having a relatively thick wall in a localized region thereof for the purpose of counterbalancing unbalanced weight in a tire casing with which the tube is assembled in a wheel and tire assembly.

Prior to my invention a tube having a relatively thick wall in a part thereof has been provided for the same purpose, as claimed in an application of Earl H. Barder and Clarence E. Snyder filed concurrently herewith, but, except as claimed in the said application, I am the originator of the procedure and apparatus described therein and in the present specification.

Of the accompanying drawings:

Fig. 1 is a side elevation of apparatus embodying and adapted to carry out my invention in its preferred form, with parts broken away.

Fig. 2 is a section on line 2—2 of Fig. 1.

Fig. 3 is an elevation, with parts sectioned and broken away, of a valve mechanism constituting a part of the apparatus.

Fig. 4 is a section on line 4—4 of Fig. 2.

Fig. 5 is an elevation, with a part sectioned and broken away, of an inner tube produced by the practice of my invention.

Fig. 6 is an elevation of parts of apparatus embodying and adapted for the practice of my invention in a modified form.

Fig. 7 is a section on line 7—7 of Fig. 6.

Fig. 8 is a section on line 8—8 of Fig. 7.

Referring to the drawings, the preferred form of apparatus shown in Figs. 1 to 4 comprises an extruding machine 10 adapted to extrude a continuous tube 11 of rubber composition.

The finished inner tube 12, Fig. 5, has a relatively thick zone 13 in its wall, preferably in its tread region for the maximum counterbalancing effect for a given amount of extra stock, and for providing a succession of such relatively thick zones in the continuous tube 11 as it is formed by the extruding machine, at such intervals that a thickened zone will be provided in the vicinity of the valve stem in a succession of inner tubes made from lengths of stock cut from the continuous tube 11 the extruding machine is provided with a special head having means defining a die aperture of variable shape and means is provided for periodically changing the shape of the die aperture.

The said head comprises a nozzle 14 threaded into the cylinder of the extruding machine, as shown clearly in Fig. 4, and formed in its outer face with a recess 15, Fig. 2, for adjustably accommodating, with a close sliding fit, a pair of die-aperture defining plates 16, 17, and a face-plate 18 is secured to the nozzle by screws 19, 19 for retaining the plates 16, 17 in place.

The plates 16, 17 are rabbeted at 16ª 17ª to provide slidably overlapping portions of a combined thickness equal to that of the other portions of the individual plates and the plates are provided with respective stems 20, 21 extending beyond the peripheries of the face plate 18 for sliding the plates 16, 17 from and toward the mandrel 22, of the extruding machine, for varying the shape of the die aperture defined by the plates 16, 17 and the mandrel 22.

To provide for disposal of stock passing through the leak spaces defined by the overlapped portions of the plates 16, 17, the nozzle 14 is formed in its end face with a pair of channels 23, 23 (Fig. 2), through which the stock can escape to the exterior of the device, binding of the plates 16, 17 by stock entering the leak spaces and becoming partially vulcanized being thereby avoided.

For sliding the plates 16, 17, or for sliding one or the other of them, their stems 20, 21 are hinged at 24, 25 to respective levers 26, 27 which are fulcrumed at 28, 29 to brackets or ears formed on the face plate 18 and the outer ends of the levers are connected by a link assembly comprising a two-way-acting cylinder 30 hinged at 31 to one of the levers and having its piston rod 32 hinged at 33 to the other lever, the cylinder being provided with inlet-outlet pipes 34, 35.

It is preferred to form the tube with a relatively thick wall zone only in outer or tread portion and for this reason the upper lever 26 is shown in Fig. 2 as being held in fixed position between set screws 36, 37 mounted in the respective forks of a forked bracket 38 formed integrally with the face plate 18, so that the upper plate 16 remains at a fixed distance from and concentric with the mandrel 22 and therewith defines a half-circular space of a radial dimension corresponding to the general wall thickness of the tube to be produced, whereas the lower lever 27 extends with substantial play between a pair of set-screws 39, 40 mounted in the respective forks of a forked bracket 41 formed integrally with the face plate 18, the upper set screw 39 of the pair being set at such position that the lower aperture-defining plate 17 will be in concentric relation to the mandrel 22 and at the same distance therefrom as the upper plate 16 when the upper end of the cylinder 30 is charged to lift the lever 27 into contact with the set-screw 39, and will be in a lower, eccentric position corresponding to thickness desired in the relatively thick, counterbalancing zone of the tube when the lever 27 is forced against the lower set-screw 40 by charging of the lower end of the cylinder 30.

For alternately charging the upper and lower ends of the cylinder 30 and venting the other end in proper timed relation to the advance of the extruded tube 11 the inlet-outlet pipes 34, 35 are connected to respective pipes 42, 43 which are associated with a control-valve assembly 44 having a supply pipe 45 and a vent pipe 46.

The valve assembly comprises a casing formed with an upper chamber 47 (Fig. 3) which is in constant communication with the supply pipe 45 through a port 48. Mounted between the floor of said chamber and the base of the casing are a pair of tubular valve members 49, 50, each formed with a partition 51, 52, near its middle.

The upper end of the member 49 is in constant communication with the chamber 47 through a port 53 and the upper end of the member 50 is in constant communication with the chamber 47 through a port 54.

The member 49 is formed with a set of apertures such as the aperture 55 through its side wall above the partition and with a set of apertures such as the aperture 56 through its side wall below the partition, and the member 50 is likewise formed with sets of apertures such as the apertures 57 and 58.

Slidably mounted upon the member 49 is an internally recessed ring 59 adapted when in its upper position to shut off communication between the apertures 55 and 56, and to allow communication of the upper end of the cylinder 30 with the exhaust or vent pipe 46, through the aperture 27$^b$, and, when in its lower position, to shut off the communication with the exhaust and provide communication between the supply pipe 45 and the upper end of the cylinder 30.

A ring 60 like the ring 59 is provided upon the tubular valve member 50 and is adapted to function in the same manner for charging and venting the lower end of the cylinder.

The rings 59 and 60 are provided with respective yokes having stems 61, 62 slidably mounted in and extending to the exterior of the casing and for simultaneously moving the rings in opposite directions the upper ends of the stems are hinged at 63, 64 to the respective arms of a lever 65 which is hinged at its middle to a bracket 66 formed on the top of the casing.

The outer ends of the lever 65 have link connection to the cores of respective solenoids 67, 67$^a$ which are in respective electric circuits 68, 69 controlled by a mercury switch 70 mounted upon a standard 71 which rises from the frame of a conveyor 72 adapted to convey the continuous tube 11 from the extruding machine.

A pair of levers 73, 74 are pivoted at 75 on the standard 71 for tilting the mercury switch in one direction and then the other, the lever 73 having a rearward extension 73$^a$ adapted to be contacted by a dog 76$^a$ on a measuring wheel 76 rotatably resting upon the tube, for actuating the lever, and the lever 74 having connection through a link 77 with a lever 78 pivoted at 79 on the standard and having a rearward extension 80 adapted to be contacted by the dog 76$^a$ for actuating the lever 74, the levers 73 and 74 being adapted to be returned to their lowermost positions by gravity, against respective stops 81, 82 as the dog 76$^a$ passes out of contact with the lever extensions 73$^a$, 80.

It is believed that the operation of the apparatus will be entirely clear from the foregoing, the lower die-aperture plate 17 being periodically lowered for a time corresponding to the movement of the dog 76$^a$ from the lever extension 73$^a$ to the lever extension 80, to provide the successive thick zones in the continuous tube at intervals corresponding to the length thereof representing a finished inner tube.

The continuous tube preferably is subsequently severed into lengths at such positions that the valve stem can conveniently be mounted in the wall of each length at a position cross-sectionally opposite to the relatively thick zone, and before or after the valve stem is so mounted the ends of the length are spliced together and the resulting endless tube is vulcanized in a mold under internal fluid pressure or in any other known or preferred way.

The above stated object is thus conveniently and economically attained.

In the modification shown in Figs. 7 and 8 the extruding machine is of the side-delivery type and a shutter similar to a camera shutter and comprising an outer circumferential series of overlapped plates 83, 83 and an inner circumferential series of overlapped plates 84, 84 are provided for defining and varying the size of the die aperture.

The plates of the outer series are slidably held in position between the casing 85 of the extruding machine nozzle and an annular member 86 secured to the casing by screws 87, 87, and the plates of the inner series are slidably held in position between an internal, central arm 88, formed integrally with the casing, and a cup-shaped member 89 secured upon a reduced extension of the arm by a nut 90.

For radially adjusting the plates of the outer series they have dove-tail connection at their outer ends with the generally conical inner wall of an annular cam member 91 slidably mounted upon the annular member 86 and adapted to be adjusted axially of the nozzle by a ring 92 threaded upon the casing 85, the ring 92 being internally formed with an annular groove in which are slidably mounted the outer ends of pins 93, 93 projecting from the annular cam member 91 through axially disposed slots 94, 94 formed in the casing 85 of the nozzle.

For radially adjusting the plates of the inner series they have dove-tail connection at their inner ends with the generally conical outer wall of a cam member 95 slidably mounted on the reduced extension of the arm 88 and adapted to be adjusted axially of the nozzle by slide bars 96, 96 extending through longitudinal holes in the arm and connecting the cam member 95 with a disc 97 having its margin mounted in an inner annular groove defined by an annular two-part screw-plug 98 mounted in a threaded socket formed in the casing 85.

The apparatus of this modification is adapted for forming tubes of different cross-sectional diameters or for forming a continuous tube of varying wall thickness for counterbalancing purposes as above discussed, the ring 92 and the screw-plug 98 being formed to receive suitable spanner wrenches for turning them.

I claim:

1. Apparatus for making inner tubes for tires, said apparatus comprising an extruding die adapted to form a continuous tube of uniform cross-section, and means for adjusting the die during the extrusion of said tube to change the wall thickness of the tube around a portion of its circumference.

2. Apparatus for making inner tubes for tires, said apparatus comprising an extruding die adapted to form a continuous tube of uniform cross-section, and means for automatically adjusting the die to change the wall thickness of the tube around a portion of its circumference.

3. Apparatus for making inner tubes for tires, said apparatus comprising an extruding die adapted to form a continuous tube of uniform cross-section, and means controlled by the extruded tube for automatically adjusting the die during extrusion of the tube to change the cross-sectional area of the tube.

4. Apparatus for making inner tubes for tires, said apparatus comprising an extruding die adapted to form a continuous tube of uniform cross-section, and means controlled by the extruded tube for automatically adjusting the die during the extrusion of the tube to change its wall thickness around a portion of its circumference.

5. Apparatus for making inner tubes for tires, said apparatus comprising an extruding die formed of a plurality of die elements defining an extruding orifice adapted to form a continuous tube, and means located in the path of the tube and actuated thereby for periodically adjusting said elements to form successive thickened portions of the tube wall.

6. Apparatus for making inner tubes for tires, said apparatus comprising an extruding die formed of a plurality of die elements defining an extruding orifice adapted to form a continuous tube, and means located in the path of the tube and actuated thereby for periodically adjusting said elements to form successive thickened portions along a portion of the circumference of the tube.

7. The method of making an inner tube which comprises continuously extruding a rubber tube from an adjustable die, and intermittently adjusting the die to form thickened portions extending around part of the circumference of the tube.

8. The method of making an inner tube which comprises continuously extruding a rubber tube from an adjustable die, and adjusting the die during the extruding of the tube to determinately change the wall thickness of the tube throughout a part of its circumference.

HARRY E. WANER.